(12) United States Patent
Senile et al.

(10) Patent No.: US 8,122,722 B2
(45) Date of Patent: *Feb. 28, 2012

(54) EXHAUST NOZZLE SEAL WITH SEGMENTED BASESHEET DISPOSED BETWEEN SIDE RAILS

(75) Inventors: Darrell Glenn Senile, Oxford, OH (US); Valentine Robert Boehm, Jr., Cincinnati, OH (US); Bernard James Renggli, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1289 days.

This patent is subject to a terminal disclaimer.

(21) Appl. No.: 12/040,324

(22) Filed: Feb. 29, 2008

(65) Prior Publication Data

US 2009/0217670 A1 Sep. 3, 2009

(51) Int. Cl.
*F02K 1/00* (2006.01)
(52) U.S. Cl. ........ 60/770; 60/771; 239/265.19; 277/637
(58) Field of Classification Search ............ 60/770, 60/771; 239/265.19, 265.39; 277/637, 632, 277/650, 654
See application file for complete search history.

(56) References Cited

U.S. PATENT DOCUMENTS

| | | | | |
|---|---|---|---|---|
| 3,612,400 A * | 10/1971 | Johnson et al. | ........... | 239/265.19 |
| 4,690,330 A * | 9/1987 | Robinson et al. | ........ | 239/265.39 |
| 5,039,014 A | 8/1991 | Lippmeier | | |
| 5,076,496 A | 12/1991 | Lippmeier | | |
| 5,261,605 A * | 11/1993 | McLafferty et al. | ..... | 239/265.35 |
| 5,485,959 A | 1/1996 | Wood et al. | | |
| 5,584,173 A | 12/1996 | Lybarger | | |
| 5,667,140 A | 9/1997 | Johnson et al. | | |
| 5,680,755 A | 10/1997 | Hauer et al. | | |
| 5,683,034 A * | 11/1997 | Johnson et al. | ........... | 239/265.35 |
| 5,779,152 A * | 7/1998 | Renggli et al. | ............ | 239/265.33 |
| 5,797,544 A * | 8/1998 | Ward | ........................ | 239/265.37 |
| 6,148,608 A * | 11/2000 | Martin et al. | .................... | 60/232 |
| 6,471,469 B2 | 10/2002 | Toffan et al. | | |
| 6,658,854 B2 | 12/2003 | Senile et al. | | |
| 6,739,050 B2 | 5/2004 | Senile et al. | | |
| 6,745,570 B2 | 6/2004 | Renggli et al. | | |
| 6,935,118 B2 | 8/2005 | Gould et al. | | |
| 6,983,602 B2 | 1/2006 | Senile | | |
| 7,013,650 B2 * | 3/2006 | Mandet | ........................... | 60/771 |
| 7,028,462 B2 * | 4/2006 | Carper et al. | .................... | 60/230 |
| 7,096,661 B2 * | 8/2006 | Bush et al. | ....................... | 60/232 |
| 7,117,682 B1 * | 10/2006 | Sevi et al. | ........................ | 60/771 |
| 7,302,793 B2 * | 12/2007 | Senile et al. | .................... | 60/232 |
| 7,310,949 B2 * | 12/2007 | Carper | ............................ | 60/772 |
| 7,631,481 B2 * | 12/2009 | Cowan et al. | .................. | 60/39.5 |
| 7,757,477 B2 * | 7/2010 | Kehret et al. | .................... | 60/266 |
| 2009/0217670 A1 * | 9/2009 | Senile et al. | .................... | 60/770 |
| 2009/0217671 A1 * | 9/2009 | Senile et al. | .................... | 60/771 |

* cited by examiner

*Primary Examiner* — William H Rodriguez
(74) *Attorney, Agent, or Firm* — William Scott Andes; Steven J. Rosen (57) ABSTRACT

An aircraft engine exhaust nozzle basesheet includes longitudinally extending plurality of basesheet segments having panel bodies between segment leading and trailing edges and slidable sealing joints with slidingly un-restrained center surfaces between adjacent segment leading and trailing edges. Segmented first and second basesheet side edges include first and second segment side edges of the basesheet segments respectively. Slidably sealingly engaged overlapping flanges at the segment leading and trailing edges include tacked together transversely spaced apart first and second distal ends of the overlapping flanges. A basesheet assembly includes a frame includes first and second side rails supporting the first and second basesheet side edges. An aircraft gas turbine engine exhaust nozzle includes divergent seals with the basesheet assemblies in sealing engagement against divergent flaps along the first and second side rails.

32 Claims, 10 Drawing Sheets

EXHAUST NOZZLE SEAL WITH SEGMENTED BASESHEET DISPOSED BETWEEN SIDE RAILS

BACKGROUND OF THE INVENTION

1. Field of the Invention

This invention relates generally to gas turbine engine exhaust nozzles and, more particularly, to gas turbine engine exhaust nozzle seals with segmented basesheets.

2. Description of Related Art

Military aircraft gas turbine engines often include variable geometry exhaust nozzles. The variable geometry exhaust nozzle varies throat and exit areas of the exhaust nozzle using flaps and seals. Examples of such engines are the General Electric F110 and the F414. The flaps and seals define the flowpath and the seals, as their name implies, seal against adjacent flaps. Because the exhaust nozzles are subjected to high temperatures and thermal gradients as a result of hot combustion gases exiting the engine, the variable geometry nozzle must maintain a coherent flowpath while shielding nozzle structural components.

Nozzle divergent flaps and seals incorporating backbones to secure the basesheets have been used for the divergent section of convergent/divergent variable geometry nozzles. A flowpath surface of the seal basesheet is exposed to hot combustion gases in an exhaust stream of the nozzle, while a backside of the seal is in a cooler environment. The temperature differential causes distortion and premature wear fatigue failure. It is desirable to have good sealing between the divergent seal and its adjacent flaps while allowing for movement in the axial or longitudinal direction while restraining the basesheet in the radial and transverse directions to eliminate the cause of distortion in the radial direction. It is desirable to prevent thermal differentials between the flowpath surface and the backside from causing excessive distortion leading to premature wear or fatigue of the basesheet while still providing good sealing with the adjacent flaps.

BRIEF SUMMARY OF THE INVENTION

An aircraft gas turbine engine exhaust nozzle basesheet includes a longitudinally extending plurality of basesheet segments. Each of the basesheet segments includes a panel body extending between longitudinally spaced apart segment leading and trailing edges and transversely spaced apart first and second segment side edges. First and second basesheet side edges are formed by the first and second segment side edges respectively. Slidable sealing joints include slidingly un-restrained center surfaces between adjacent ones of the segment leading and trailing edges.

An exemplary embodiment of the basesheet includes slidably sealingly engaged overlapping flanges at the adjacent ones of the segment leading and trailing edges and tacked together transversely spaced apart first and second distal ends of the overlapping flanges. The overlapping flanges may be inwardly and outwardly bent over flanges overlapping along a common interface. Inwardly bent ribs support the inwardly bent over flanges at the segment leading edges and outwardly bent ribs support the outwardly bent over flanges at the segment trailing edges. The first and second segment side edges may be flat. Gaps may be placed between the adjacent ones of the inwardly and outwardly bent ribs.

An exemplary aircraft gas turbine engine exhaust nozzle basesheet assembly includes the basesheet mounted by the first and second basesheet side edges in first and second side rails of a frame respectively. Each of the first and second side rails have longitudinally extending upper and lower rail segments and the basesheet and the basesheet segments are disposed and trapped between the upper and lower rail segments. The panel body of each of the basesheet segments are sandwiched between the upper and lower rail segments and the panel body of each of the basesheet segments is bonded, such as by tack welding, to the upper and lower rail segments of first and second side rails along the first and second segment side edges respectively. The upper rail segments include longitudinally spaced apart and transversely extending slots and adjacent ones of the leading edge outwardly and inwardly bent ribs of the basesheet segments are received within and clipped together by the slots.

Forward, center, and aft hangers having lug portions, extend substantially perpendicularly upwardly from substantially flat hanger heads. Transversely spaced apart first and second tabs of the hanger heads are disposed between forward, center, and aft raised flanges of the upper rail segment and the panel bodies of supporting ones of the basesheet segments. The lug portions of the forward and center hangers have forward and center retaining hooks respectively. The basesheet and frame are mounted to a longitudinally extending backbone by the forward, center, and aft hangers. The forward and center retaining hooks engage forward and center shelves at forward and center attachment locations of the backbone. The lug portion of the aft hanger are connected to the backbone at the aft attachment location.

An exemplary aircraft gas turbine engine exhaust nozzle includes divergent seals sealingly engaged with divergent flaps. Each of the divergent seals includes the basesheet assembly containing the basesheet with the plurality of basesheet segments. The divergent seals seal against the divergent flaps along the first and second side rails. Longitudinally spaced apart sets of forward and aft vibration dampeners extend transversely away from and outboard with respect to the backbone and are sprung to engage a back side of the basesheet assembly or the basesheet.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
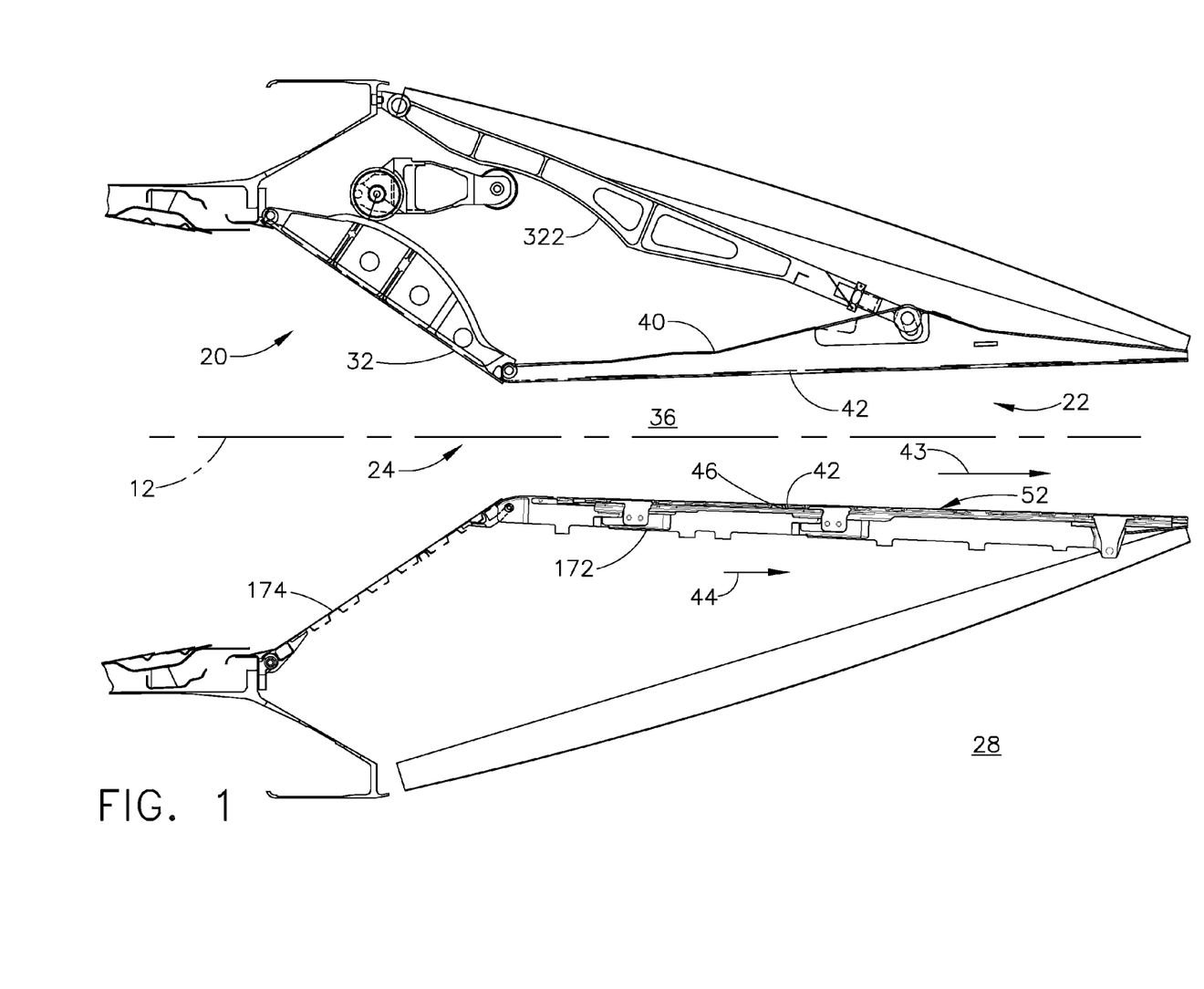
FIG. 1 is a cross-sectional schematic view illustration of a gas turbine engine variable exhaust nozzle.

Illustrated in FIG. 1 is a gas turbine engine variable geometry exhaust nozzle 28 including a convergent and divergent sections 20, 22 circumscribing an axis 12 and defining a throat 24 therebetween. The exhaust nozzle 28 includes convergent flaps 32 and convergent seals 174 in the convergent section 20 and divergent flaps 40, rotated by struts 322, and divergent seals 172 in the divergent sections 22. Flowpath sides 42 of basesheets 52 of the divergent seals 172 are exposed to hot exhaust gases 43 exiting the exhaust nozzle 28 and, thus, the flowpath sides 42 define a portion of a flowpath 36 through the nozzle. Cold sides 46 of the basesheets 52 are opposite to the flowpath sides 42 and are exposed to a much cooler environment. The temperature differential can cause distortion and can lead to premature wear fatigue failure of the seals and, more particularly, of the basesheets 52.

Figure 2:
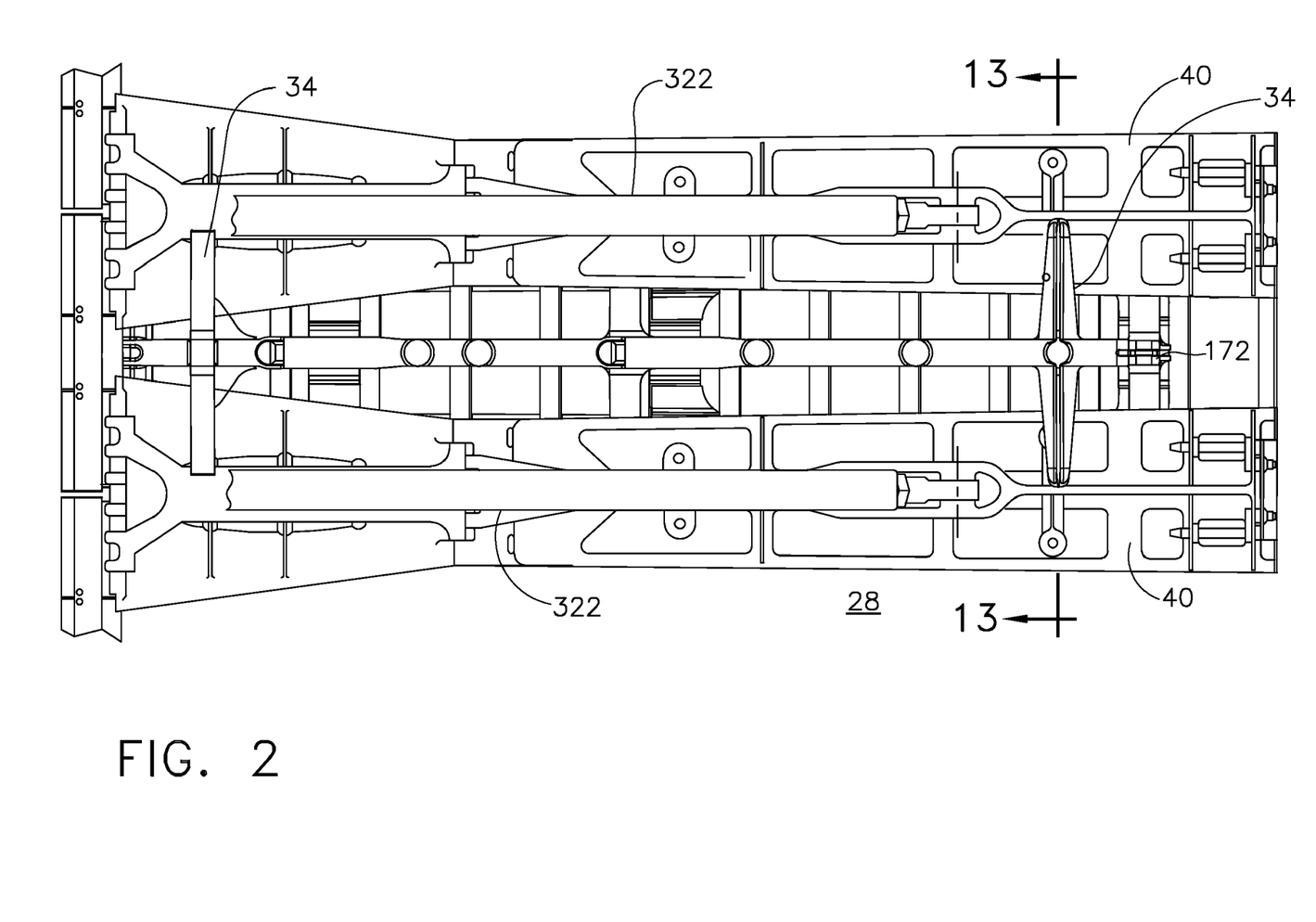
FIG. 2 is a radially inwardly looking planform view illustration of flaps and a seal in the nozzle illustrated in FIG. 1.

The divergent seals 172 are hung onto and supported by the divergent flaps 40 with the use of angel wing hangers 34 as illustrated in FIG. 2. Longitudinally spaced apart sets of forward and aft vibration dampeners 228, 230 extend transversely away from and outboard with respect to the longitudinally extending backbone 50. The vibration dampeners are sprung to engage a back side 107 of a basesheet assembly 51 or the basesheet 52. The divergent seals 172 seal against the divergent flaps 40.

Figure 3:
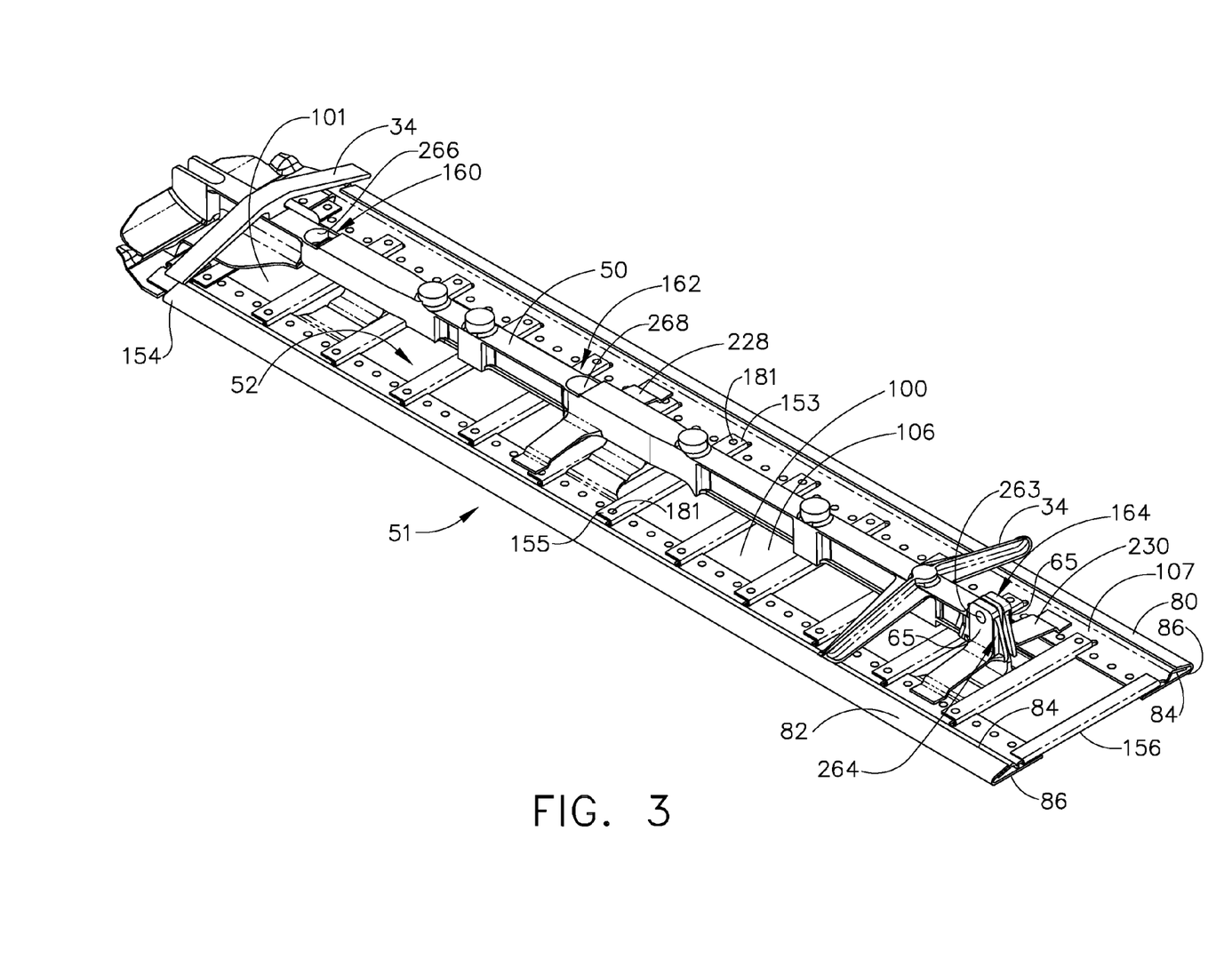
FIG. 3 is a perspective view illustration of a basesheet assembly in the divergent seal illustrated in FIGS. 1 and 2.
Figure 4:
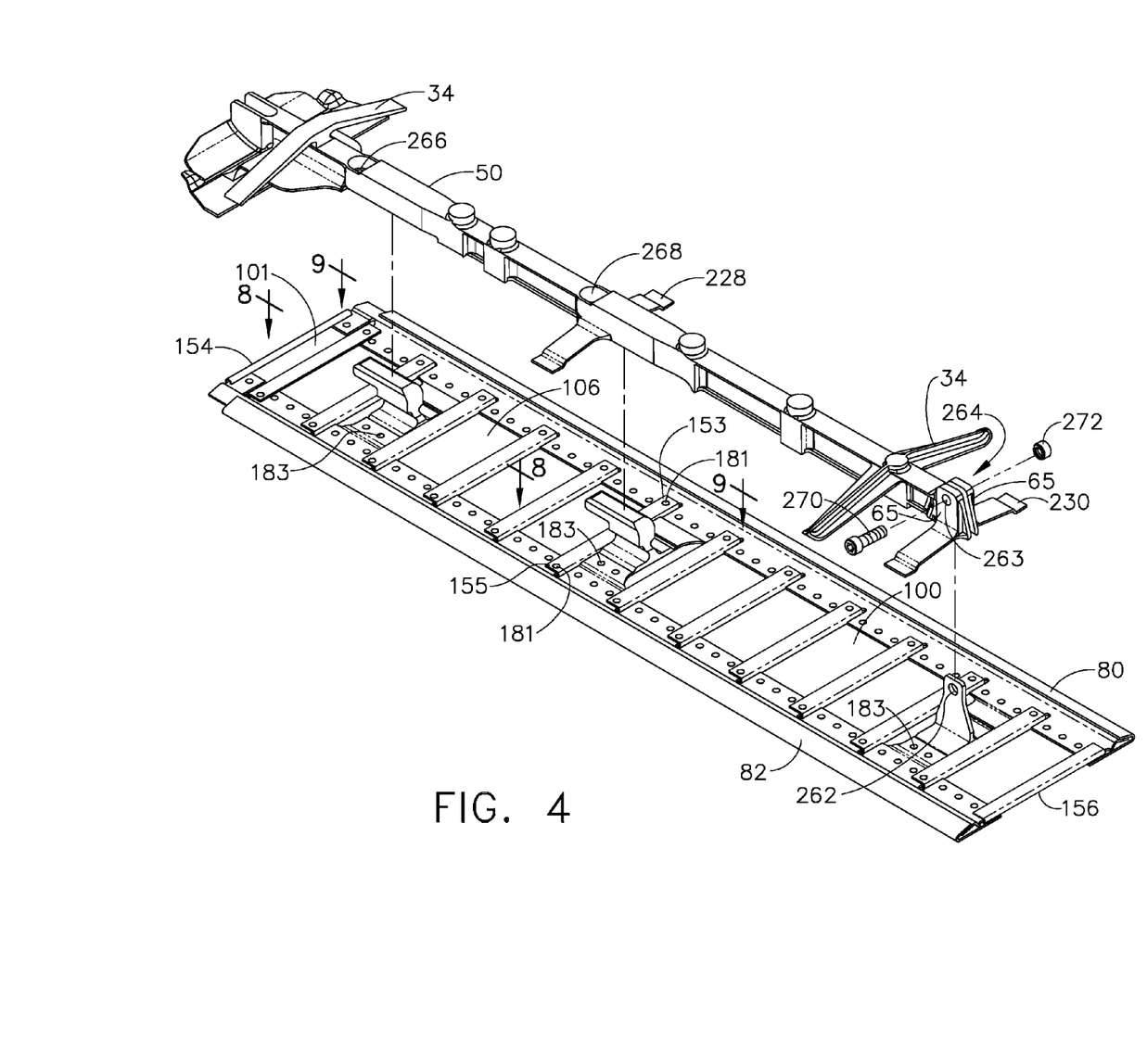
FIG. 4 is a partially exploded perspective view illustration of the divergent seal and basesheet assembly illustrated in FIG. 3.

Illustrated in FIG. 3 and in a partially exploded view in FIG. 4 is the divergent seal 172 including the longitudinally extending backbone 50 supporting the basesheet assembly 51 with the basesheet 52. The backbone 50 extends longitudinally from a forward end 154 to an aft end 156. The backbone 50 includes longitudinally spaced apart forward, center, and aft attachment locations 160, 162, 164, respectively. The center attachment location 162 is located axially between the forward attachment location 160 and the aft attachment location 164. The basesheet 52 longitudinally extends between the basesheet leading and trailing edges 56, 58 and transversely between basesheet side edges 60, 62. The basesheet assembly 51 includes longitudinally extending and transversely spaced apart first and side rails 80, 82 supporting the basesheet 52 by its first and second basesheet side edges 60, 62, respectively.

Figure 5:
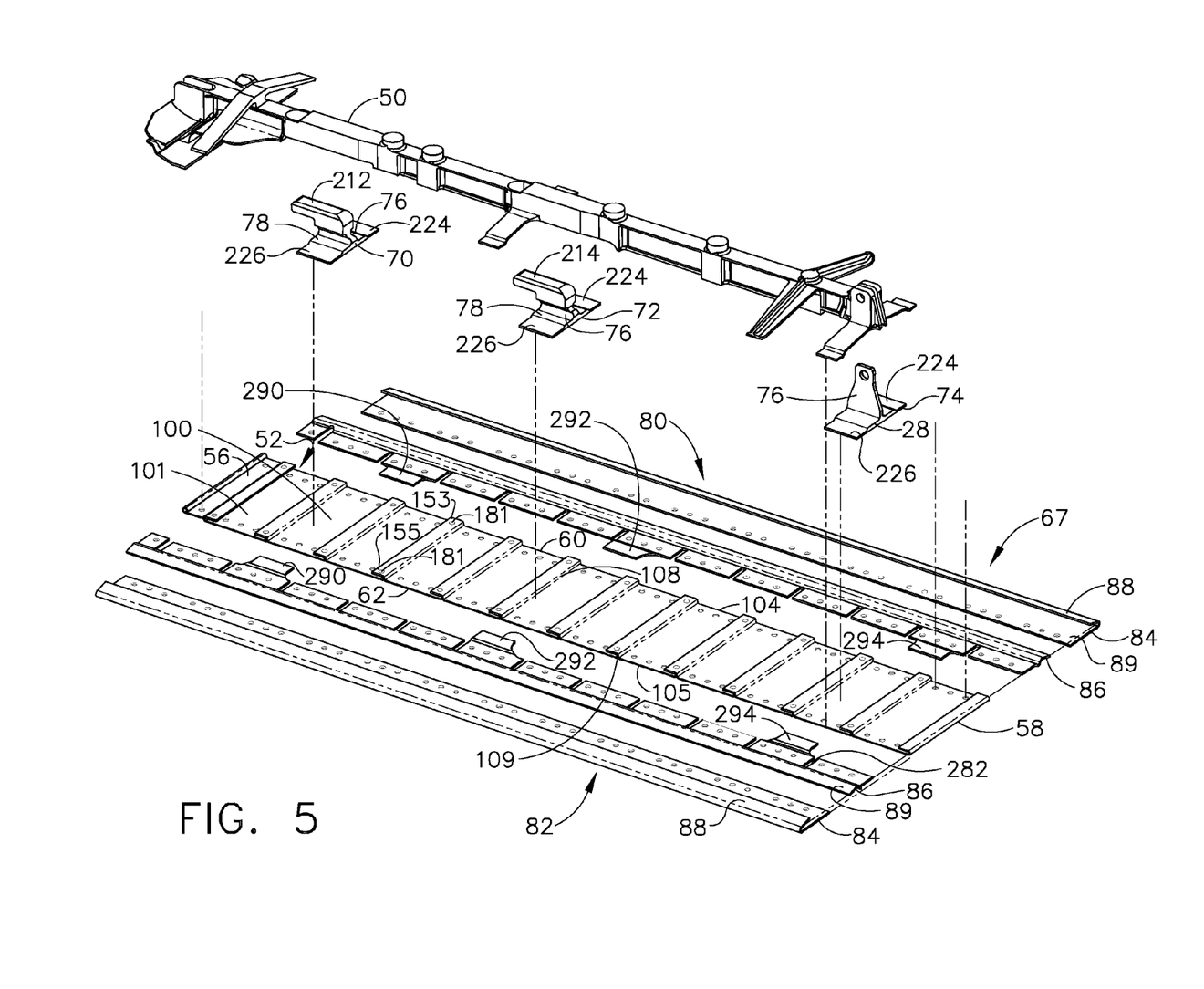
FIG. 5 is an exploded perspective view illustration of the basesheet assembly illustrated in FIG. 4.
Figure 6:
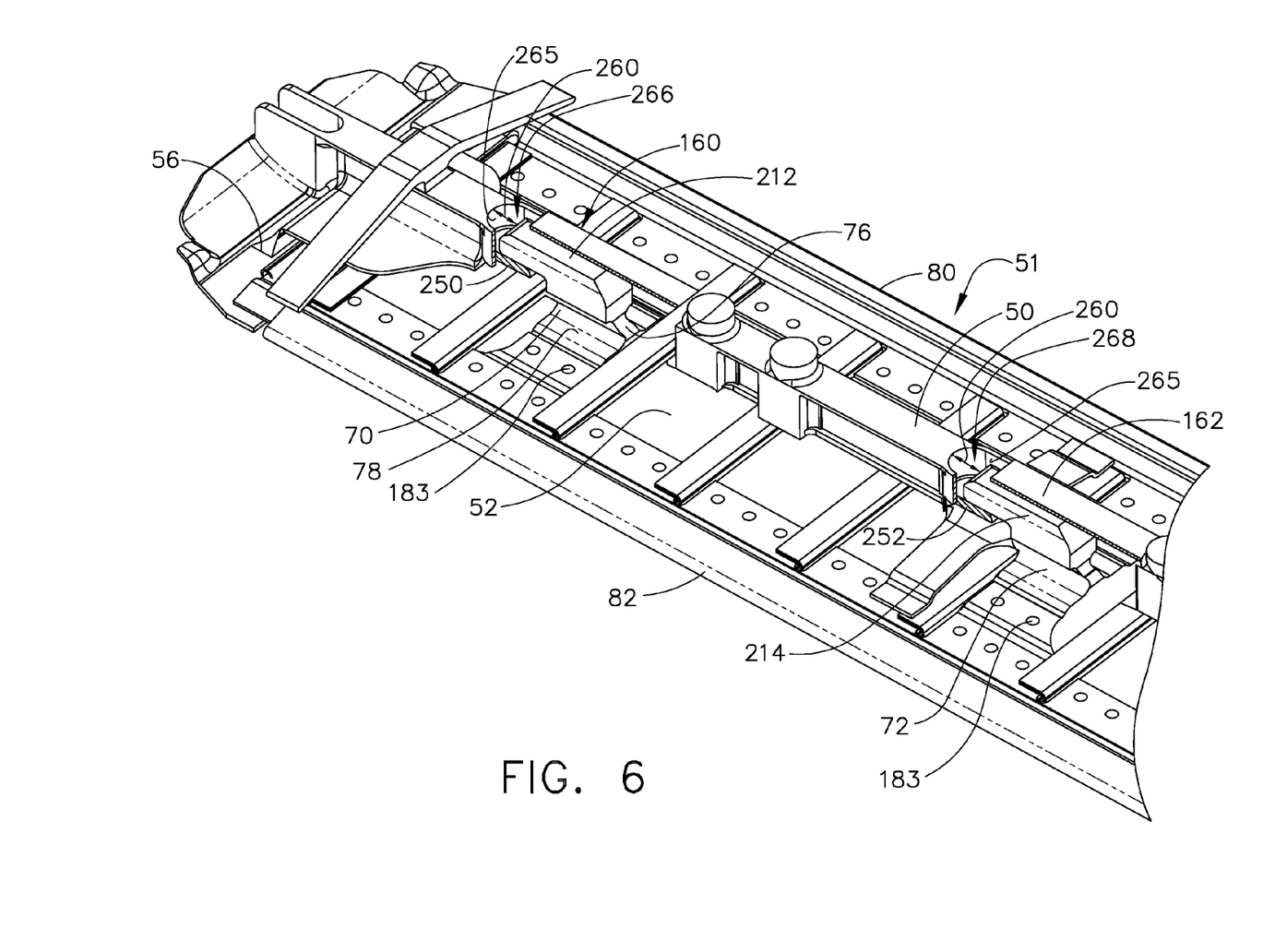
FIG. 6 is a partially cut away perspective view illustration of hooks supporting a basesheet of the basesheet assembly by engaging shelves of the backbone of the basesheet assembly illustrated in FIGS. 4 and 5.
Figure 7:
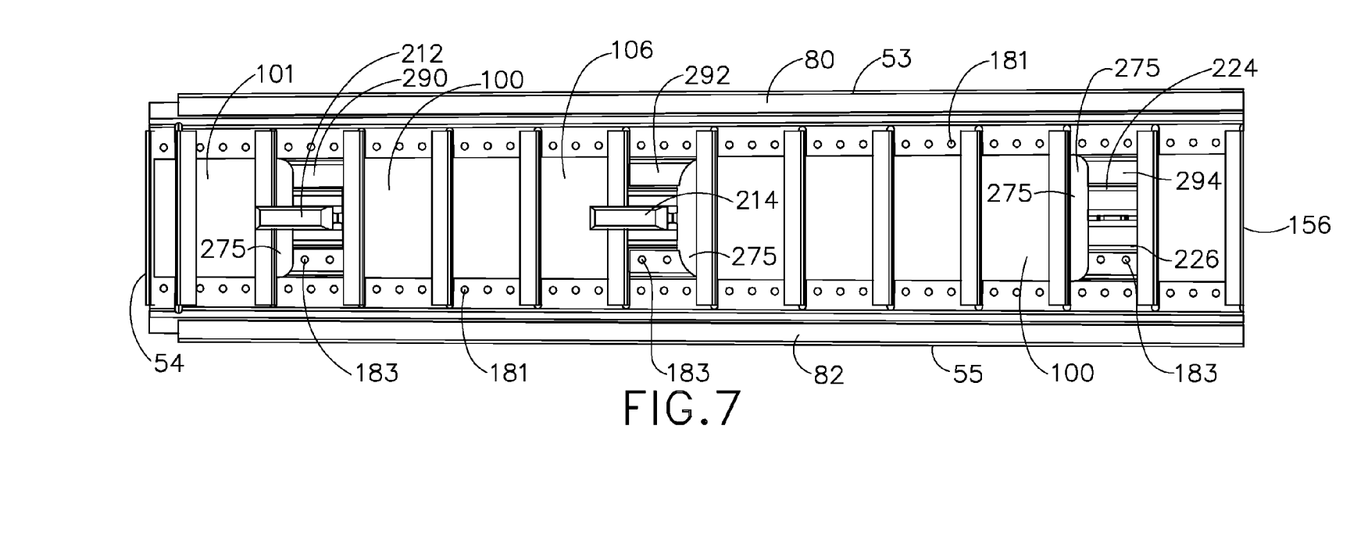
FIG. 7 is a top view illustration of the basesheet assembly illustrated in FIG. 5.
Figure 9:
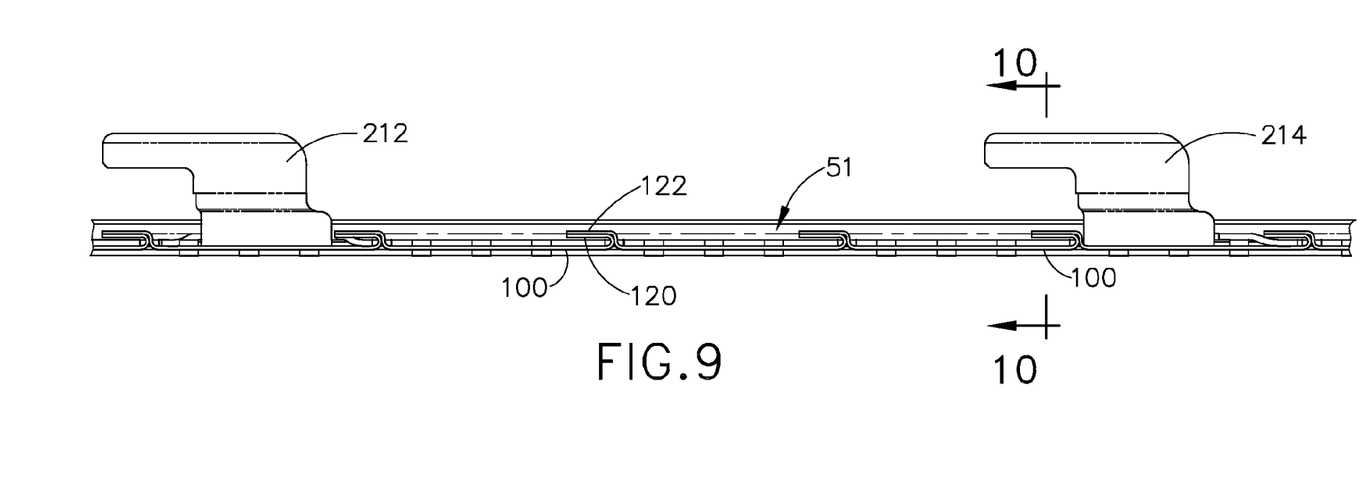
FIG. 9 is a longitudinal cross-sectional view illustration of adjacent segments of the basesheet of the basesheet assembly illustrated and taken along line 9-9 in FIG. 4.

Illustrated in FIGS. 6 and 9 are forward and center shelves 250, 252 at the forward and center attachment locations 160, 162, respectively, that are used to frictionally secure the basesheet 52 to the backbone 50 using forward and center hangers 70, 72 of the basesheet assembly 51 further illustrated in FIG. 7. The forward and center shelves 250, 252 extend radially inward from a sidewall 265 into a forward and center opening 266, 268, respectively, defined by the sidewall 265. Referring to FIGS. 3, 4, 5, and 6, forward, center, and aft hangers 70, 72, 74 of the basesheet assembly 51 are used to mount the basesheet 52 to the backbone 50. The hangers have lug portions 76 extending substantially perpendicularly upwardly from substantially flat hanger heads 78. The forward and center hangers 70, 72 include forward and center retaining hooks 212, 214. The hanger heads 78 include transversely spaced apart first and second tabs 224, 226. The forward, center, and aft hangers 70, 72, 74 are slidably mounted to the first and second side rails 80, 82 by the first and second tabs 224, 226 between upper and lower rail segments 86, 84 of the first and second side rails 80, 82.

The forward, center, and aft hangers 70, 72, 74 are part of a frame 67 containing the basesheet 52 and are mounted to the backbone 50. The forward and center retaining hooks 212, 214 frictionally engage the forward and center shelves 250, 252, respectively, so that the hooks are spaced a longitudinal distance 260 away from the sidewall 265. Referring to FIGS. 3, 4, and 5, the lug portion 76 of the aft hanger 74 has a first aperture 262 and is disposed in a clevis 264 of the backbone 50 at the aft attachment location 164. The clevis 264 has two arms 65 having second apertures 263 that are aligned with the first aperture 262 when the frame 67 is in an installed position so as to receive a fastener such as screw 270 secured by a nut 272 to provide axial or longitudinal retention of the frame 67 to the backbone 50 to prevent the forward and center retaining hooks 212, 214 from axially disengaging from the forward and center shelves 250, 252, respectively. The two arms 65 are part of the aft vibration dampener 230.

The basesheet 52 is constructed from a plurality of basesheet segments 100 as illustrated in FIGS. 3-5 and 7-9. The basesheet segments 100 are fabricated from a metallic material in the embodiment illustrated herein but may otherwise be fabricated from different materials such as a silicon-carbon graphite material. The basesheet segments 100 are connected together, as described below, and extend between the basesheet leading and trailing edges 56, 58, respectively, and between the basesheet side edges 60, 62. Each of the basesheet segments 100 has a panel body 106 defined between a pair of transversely spaced apart and substantially parallel first and second segment side edges 104, 105 longitudinally extending between segment leading and trailing edges 108, 109, respectively. Thus, the basesheet side edges 60, 62 are segmented because they are defined by the first and second segment side edges 104, 105. The divergent seals 172 seal against the divergent flaps 40 along the continuous and longitudinally extending and transversely spaced apart first and second side rails 80, 82 which support the basesheet 52 by its first and second basesheet side edges 60, 62 respectively.

Figure 8:
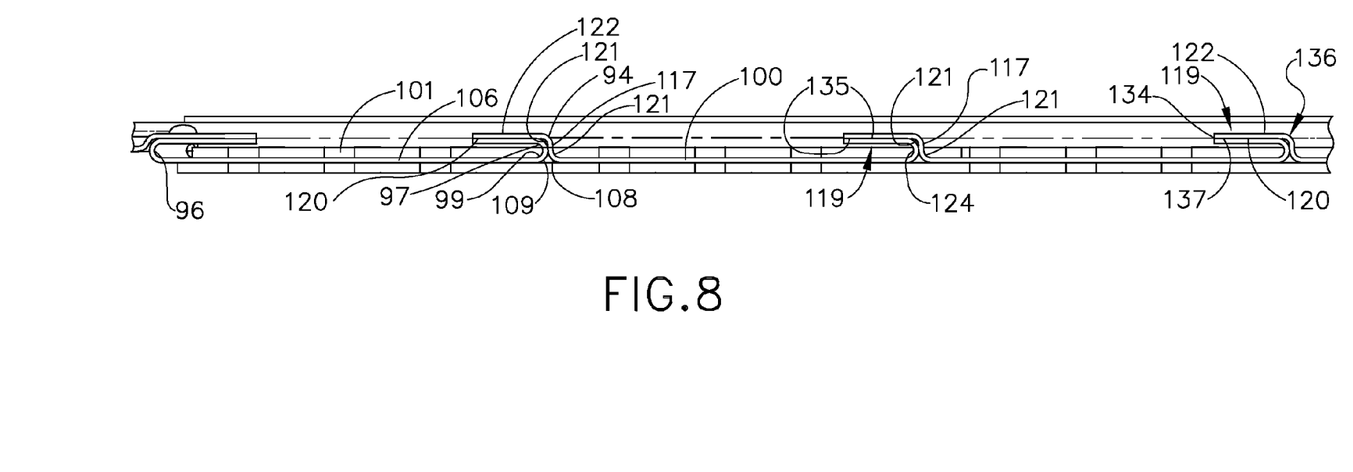
FIG. 8 is a longitudinal cross-sectional view illustration of a forward section of the basesheet illustrated in and taken along line 8-8 in FIG. 4.
Figure 11:
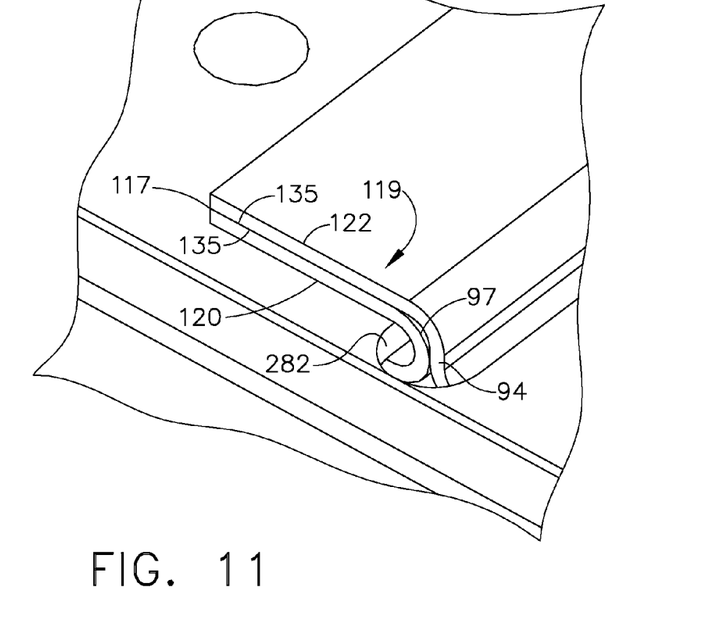
FIG. 11 is a perspective view illustration of a slits in a side rail of the basesheet assembly clipping together the adjacent segments illustrated in FIG. 4.

Referring to FIGS. 8, 9 and 11, all of the basesheet segments 100, except for the first or forwardmost segment 101, have leading edge outwardly bent ribs 94 and trailing edge inwardly bent ribs 97. The trailing edge inwardly bent ribs 97 are bent inwardly over the panel body 106. The trailing edge inwardly bent ribs 97 are substantially 180 degree bends 124, support inwardly bent over flanges 120 that are formed integrally with the panel body 106 at the segment trailing edge 109. The inwardly bent over flanges 120 are positioned over, spaced apart from, and substantially parallel to the panel body 106 forming channels 99 therebetween.

The leading edge outwardly bent ribs 94 are bent outwardly and longitudinally away from the panel body 106. The leading edge outwardly bent ribs 94 include jogs 117 supporting outwardly bent over flanges 122 that are substantially parallel to the panel body 106 at the segment leading edge 108. The jogs 117 have two substantially 90 degree bends 121 and the outwardly bent over flanges 122 are positioned longitudinally away from and substantially parallel to the panel body 106 and formed integrally with the panel body 106 at the segment leading edges 108. The first or forwardmost segment 101 has leading and trailing edge inwardly bent ribs 96, 97 respectively.

Slidable sealing joints 134 with slidingly un-restrained center surfaces 135 are disposed between adjacent ones of the basesheet segments 100 and are illustrated herein as overlap or shiplap joints 136. The shiplap joints 136 include overlapping flanges 119 and in slidably sealing engagement and, more particularly, the outwardly bent over flanges 122 of overlapping and in slidably sealing engagement with the inwardly bent over flanges 120 of the adjacent ones of the basesheet segments 100. The slidingly un-restrained center surfaces 135 are on the overlapping inwardly and outwardly bent over flanges 120, 122 along a common interface 137. The slidable sealing joints 134 and, more particularly, shiplap joints 136 allow the adjacent ones of the basesheet segments 100 to move relative to each other without distorting due to temperature differentials.

Figure 12:
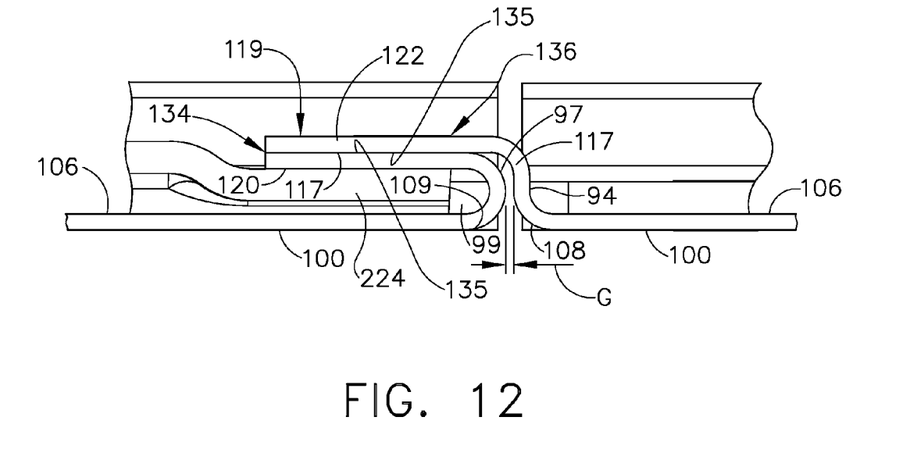
FIG. 12 is an enlarged longitudinal cross-sectional view illustration of a gap between adjacent segments of the basesheet of the basesheet assembly illustrated in FIG. 8.

Gaps G are provided between adjacent ones of the leading and trailing edge ribs to accommodate longitudinal thermal growth of the adjacent ones of the basesheet segments 100 and/or forwardmost segment 101 of the basesheet 52. During assembly of the segments to form the basesheet 52, the gap G is set with spacers. An example of the dimension of the gap G is 0.025 inches with a plus or minus tolerance of 0.010 inches for a sheet metal thickness of the basesheet segments 100 being about 0.020 inches.

The seal basesheet flowpath surface is exposed to the combustion gases in the exhaust stream while the backside of the seal is in a cooler environment. The temperature differential causes distortion and premature wear fatigue failure. The secondary backbone stiffener allows movement in the axial direction while restraining the basesheet segments in the radial and transverse directions, thus, eliminating the cause of distortion in the radial direction. The segments allow local movement relative to each other due to thermal differential between the flowpath surface and the backside along with the thermal differential between the centerline and the axial edges. The segmented design frees the center of the seal between the segments so the movement does not accumulate over the length of the seal or cause distortion leading to premature wear or fatigue while still providing good sealing with the adjacent flaps.

Adjacent ones of the basesheet segments 100 are arranged such that the outwardly bent over flanges 122 overlap inwardly bent over flanges 120 of the adjacent ones of the basesheet segments 100. Transversely spaced apart first and second distal ends 153, 155 of the overlapping inwardly and outwardly bent over flanges 120, 122 are attached or, more particularly, tacked together such as by spot welding as illustrated by spot welds 181. One of the spot welds 181 is at each of the spaced apart first and second distal ends 153, 155 in FIGS. 4, 5 and 6.

Referring to FIG. 5, the basesheet 52 has first and second basesheet side edges 60, 62, respectively, extending longitudinally between spaced apart basesheet leading and trailing edges 56, 58. Further referring to FIGS. 4, 5 and 10, the frame 67 includes the longitudinally extending transversely spaced apart first and second side rails 80, 82. The basesheet 52 and its basesheet segments 100 are mounted to and supported by the first and second side rails 80, 82. Each of the first and second side rails 80, 82 include longitudinally extending upper and lower rail segments 86, 84. The basesheet 52 and its basesheet segments 100 are disposed between and trapped between the upper and lower rail segments 86, 84. More particularly, the first and second segment side edges 104, 105 of the basesheet segments 100 are disposed between and trapped between the upper and lower rail segments 86, 84 of the first and second side rails 80, 82 respectively. The first and second segment side edges 104, 105 are illustrated in the exemplary embodiment of the basesheet segments 100 as being straight and flat in order to seal well between the upper and lower rail segments 86, 84.

Figure 10:
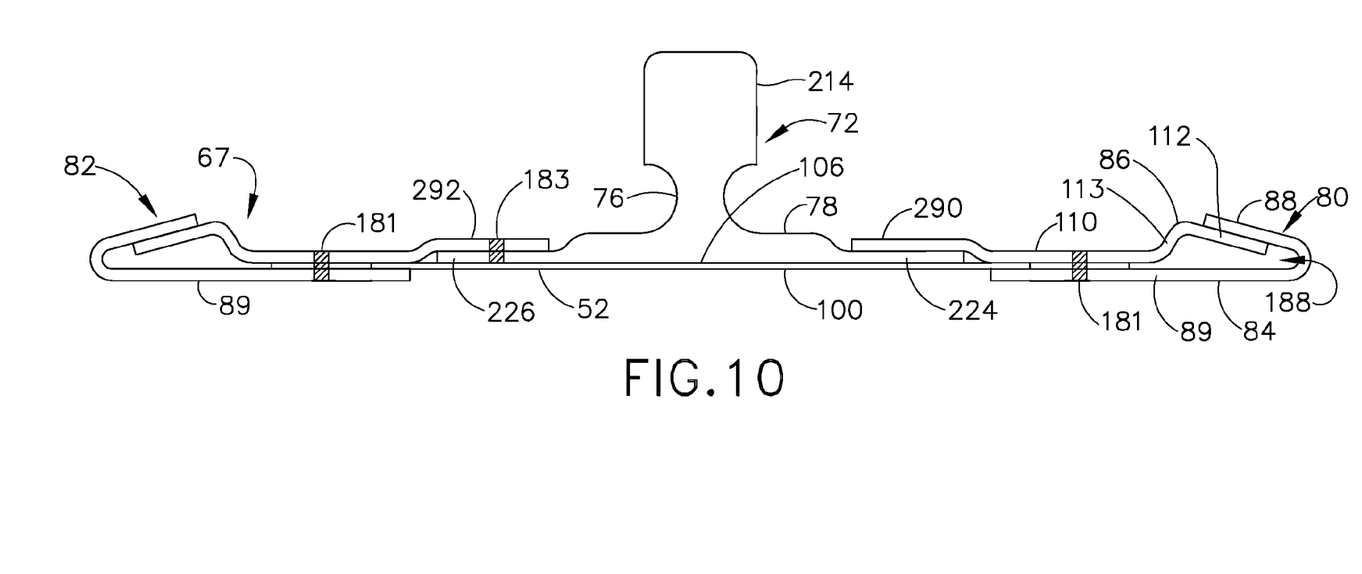
FIG. 10 is a transverse cross-sectional view illustration of a hook and basesheet segment of the basesheet assembly illustrated and taken along line 10-10 in FIG. 9.

As illustrated more particularly in FIG. 10, the upper and lower rail segments 86, 84 and the basesheet segments 100 are attached or tacked together by spot welds 181. The panel body 106 of each the basesheet segments 100 is sandwiched between the upper and lower rail segments 86, 84 and then tack welds 181 are used to bond them together. The panel body 106 of each of the basesheet segments 100 is bonded to the upper and lower rail segments 86, 84 along the first and second segment side edges 104, 105 of each of the basesheet segments 100. Each of the lower rail segments 84 has an upper leg 88 bent over a lower leg 89 of the upper rail segment 86 at an acute angle 188. Each of the upper rail segments 86 has an outboard leg 112 bent transversely outboard and away from an inboard leg 110 with a double bend 113 so that the outboard leg 112 is parallel to and mates with and abuts the upper leg 88 of the lower rail segment 84 and the inboard leg 110 is parallel to the lower leg 89 of the upper rail segment 86.

Referring to FIGS. 5, 7, and 10, the upper rail segments 86 include longitudinally spaced apart and transversely extending slots 282 which receive and clip together adjacent ones of the leading edge outwardly bent ribs 94 and the trailing edge inwardly bent ribs 97 of the basesheet segments 100 when the basesheet 52 is assembled. Forward, center, and aft raised flanges 290, 292, 294 extend transversely inboard from the upper rail segments 86 between the slots 282 and are positioned to attach the forward, center, and aft hangers 70, 72, 74 respectively to basesheet 52. The forward, center, and aft hangers 70, 72, 74 are used to mount the basesheet 52 and the frame 67 to the backbone 50.

The substantially flat and transversely extending first and second tabs 224, 226 of the hanger heads 78 are trapped between the forward, center, and aft raised flanges 290, 292, 294 of the first and second side rails 80, 82 respectively and the panel bodies 106 of supporting ones 275 of the basesheet segments 100. The second tabs 226 are spot welded or otherwise tacked to the forward, center, and aft raised flanges 290, 292, 294 of the first or second side rails 80, 82 respectively such as illustrated by spot welds 183 in FIGS. 4, 6, and 10. The first and second tabs 224, 226 are slidably trapped between the forward, center, and aft raised flanges 290, 292, 294 and the panel bodies 106 and, thus, the basesheet segments 100 and the basesheet 52 can thermally expand and contract without transferring any thermally induced loads to the backbone 50. Conversely, the rigid structure of the backbone 50 will not unduly restrict thermal growth and shrinkage of and cause warpage of the basesheet segments 100 and the basesheet 52, particularly during high heating conditions such as during afterburning or thrust augmentation.

In the exemplary embodiment, the basesheet side edges 60, 62 are tapered down in the forward or upstream direction from the basesheet trailing edge 58 to the basesheet leading edge 56. Alternatively, the basesheet side edges 60, 62 may be substantially parallel, and the basesheet leading and trailing edges 56, 58, respectively, may be substantially parallel, and substantially perpendicular with respect to the basesheet side edges 60, 62. The divergent seals 172 seal against the divergent flaps 40 along the first and second side rails 80, 82.

Then the frame 67, with the basesheet 52 mounted thereto, is mounted to the backbone 50 as illustrated in FIGS. 4 and 6. The frame 67 is slid forward such that the forward and center retaining hooks 212, 214 of the forward and center hangers 70, 72 are slid onto and frictionally engage the forward and center shelves 250, 254 at the forward and center attachment locations 160, 162, respectively. The first aperture 262 of lug portion 76 of the aft hanger 74 is then aligned with second apertures 263 in the clevis 264 of the backbone 50 at the aft attachment location 164. The lug portion 76 of the aft hanger 74 is then secured to backbone 50 by screws or other means of attaching lugs to a backbone.

Figure 13:
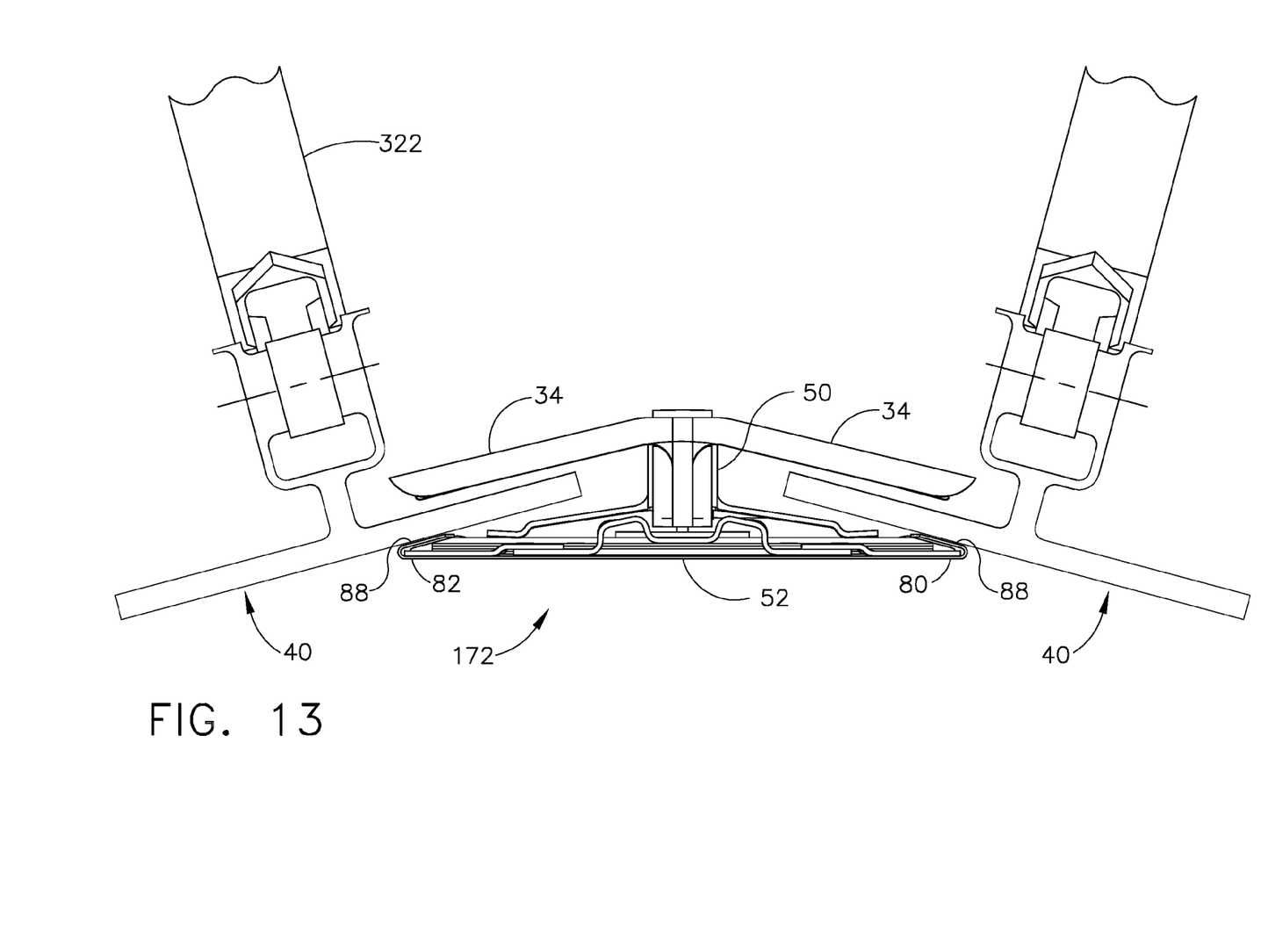
FIG. 13 is a diagrammatical cross-sectional view illustration of the base sheet sealingly engaged with the flaps in illustrated FIG. 2.

The angel wing hangers 34 are mounted to the backbone 50 and supported by the adjacent divergent flaps 40 as illustrated in FIG. 1 and further in FIG. 13. The struts 322 are connected to the divergent flap 40 as illustrated in FIGS. 1, 2, and 13. The divergent flaps 40 on each side of the divergent seal 172 are trapped by angel wings 34, mounted to the backbone 50, and the segmented basesheet 52 of the divergent seal 172 as illustrated in FIGS. 2 and 13. Thus the first and second side rails 80, 82 are spring loaded or biased radially outwardly against the adjacent flaps 40 such that the upper legs 88 of the first and second side rails 80, 82 engage and seal against the adjacent flaps 40 and the divergent flaps 40 support the divergent seals 172.

The segmented basesheet 52 reduces distortion and premature wear fatigue failure caused by temperature differentials in the hot exhaust nozzle. The segmented basesheet 52 provide good sealing between the divergent seal and its adjacent flaps while allowing for movement in the axial or longitudinal direction while restraining the basesheet segments in the radial and transverse directions to eliminate the cause of distortion in the radial direction due to thermal or temperature differentials. It accomplishes this by allowing local movement of longitudinally adjacent segments relative to each other due to thermal differential between the flowpath surface and the backside along with the thermal differential between centers of the segments and their axial edges. The segmented basesheet 52 frees up the center of the seal between the segments so the movement does not accumulate over the length of the seal or cause distortion leading to premature wear or fatigue while still providing good sealing with the adjacent flaps.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

The invention claimed is:

1. An aircraft gas turbine engine exhaust nozzle basesheet comprising:
   a longitudinally extending plurality of basesheet segments,
   each of the basesheet segments including a panel body extending between longitudinally spaced apart segment leading and trailing edges and transversely spaced apart first and second segment side edges,
   first and second basesheet side edges comprising the first and second segment side edges respectively, and
   slidable sealing joints with slidingly un-restrained center surfaces between adjacent ones of the segment leading and trailing edges.

2. An aircraft gas turbine engine exhaust nozzle basesheet as claimed in claim 1 further comprising slidably sealingly engaged overlapping flanges at the adjacent ones of the segment leading and trailing edges and tacked together transversely spaced apart first and second distal ends of the overlapping flanges.

3. An aircraft gas turbine engine exhaust nozzle basesheet as claimed in claim 2 further comprising the overlapping flanges including inwardly and outwardly bent over flanges overlapping along a common interface.

4. An aircraft gas turbine engine exhaust nozzle basesheet as claimed in claim 3 further comprising inwardly bent ribs supporting the inwardly bent over flanges at the segment leading edges and outwardly bent ribs supporting the outwardly bent over flanges at the segment trailing edges.

5. An aircraft gas turbine engine exhaust nozzle basesheet as claimed in claim 4 further comprising the first and second segment side edges being flat.

6. An aircraft gas turbine engine exhaust nozzle basesheet as claimed in claim 5 further comprising gaps between the adjacent ones of the inwardly and outwardly bent ribs.

7. An aircraft gas turbine engine exhaust nozzle basesheet assembly comprising:
   a basesheet having a longitudinally extending plurality of basesheet segments,
   each of the basesheet segments including a panel body extending between longitudinally spaced apart segment leading and trailing edges and transversely spaced apart first and second segment side edges,
   segmented first and second basesheet side edges comprising the first and second segment side edges respectively,
   slidable sealing joints with slidingly un-restrained center surfaces between adjacent ones of the segment leading and trailing edges, and
   a frame having first and second side rails supporting the first and second basesheet side edges respectively of the basesheet.

8. An aircraft gas turbine engine exhaust nozzle basesheet assembly as claimed in claim 7 further comprising each of the first and second side rails having longitudinally extending upper and lower rail segments and the basesheet and the basesheet segments are disposed and trapped between the upper and lower rail segments.

9. An aircraft gas turbine engine exhaust nozzle basesheet assembly as claimed in claim 7 further comprising slidably sealingly engaged overlapping flanges at the adjacent ones of the segment leading and trailing edges and tacked together transversely spaced apart first and second distal ends of the overlapping flanges and the overlapping flanges including inwardly and outwardly bent over flanges overlapping along a common interface.

10. An aircraft gas turbine engine exhaust nozzle basesheet assembly as claimed in claim 9 further comprising inwardly bent ribs supporting the inwardly bent over flanges at the segment leading edges and outwardly bent ribs supporting the outwardly bent over flanges at the segment trailing edges.

11. An aircraft gas turbine engine exhaust nozzle basesheet assembly as claimed in claim 10 further comprising the first and second segment side edges being flat.

12. An aircraft gas turbine engine exhaust nozzle basesheet assembly as claimed in claim 11 further comprising gaps between the adjacent ones of the inwardly and outwardly bent ribs.

13. An aircraft gas turbine engine exhaust nozzle basesheet assembly as claimed in claim 11 further comprising the panel body of each of the basesheet segments being sandwiched between the upper and lower rail segments and the panel body of each of the basesheet segments being bonded to the upper and lower rail segments of first and second side rails along the first and second segment side edges respectively.

14. An aircraft gas turbine engine exhaust nozzle basesheet assembly as claimed in claim 11 further comprising the upper rail segments including longitudinally spaced apart and transversely extending slots receiving within and clipping together adjacent ones of the leading edge outwardly and inwardly bent ribs of the basesheet segments.

15. An aircraft gas turbine engine exhaust nozzle basesheet assembly as claimed in claim 14 further comprising the panel body of each of the basesheet segments being bonded to the upper and lower rail segments by tack welds.

16. An aircraft gas turbine engine exhaust nozzle basesheet assembly as claimed in claim 11 further comprising:
forward, center, and aft hangers having lug portions extending substantially perpendicularly upwardly from substantially flat hanger heads, and
transversely spaced apart first and second tabs of the hanger heads disposed between forward, center, and aft raised flanges of the upper rail segment and the panel bodies of supporting ones of the basesheet segments.

17. An aircraft gas turbine engine exhaust nozzle basesheet assembly as claimed in claim 16 further comprising the panel body of each of the basesheet segments being sandwiched between the upper and lower rail segments and the panel body of each of the basesheet segments being bonded to the upper and lower rail segments of first and second side rails along the first and second segment side edges respectively.

18. An aircraft gas turbine engine exhaust nozzle basesheet assembly as claimed in claim 17 further comprising the upper rail segments including longitudinally spaced apart and transversely extending slots receiving within and clipping together adjacent ones of the leading edge outwardly and inwardly bent ribs of the basesheet segments.

19. An aircraft gas turbine engine exhaust nozzle basesheet assembly as claimed in claim 18 further comprising the panel body of each of the basesheet segments being bonded to the upper and lower rail segments by tack welds.

20. An aircraft gas turbine engine exhaust nozzle basesheet assembly as claimed in claim 19 further comprising the lug portions of the forward and center hangers having forward and center retaining hooks respectively.

21. An aircraft gas turbine engine exhaust nozzle basesheet assembly as claimed in claim 16 further comprising the basesheet and frame mounted to a longitudinally extending backbone by the forward, center, and aft hangers.

22. An aircraft gas turbine engine exhaust nozzle base sheet assembly as claimed in claim 21 further comprising:
the lug portions of the forward and center hangers having forward and center retaining hooks respectively,
the forward and center retaining hooks engaging forward and center shelves at forward and center attachment locations of the backbone, and
the lug portion of the aft hanger connected to the backbone at the aft attachment location.

23. An aircraft gas turbine engine exhaust nozzle comprising:
and divergent seals sealingly engaging divergent flaps,
each of the divergent seals having a basesheet assembly,
the basesheet assembly having a basesheet including a longitudinally extending plurality of basesheet segments,
each of the basesheet segments including a panel body extending between longitudinally spaced apart segment leading and trailing edges and transversely spaced apart first and second segment side edges,
segmented first and second basesheet side edges comprising the first and second segment side edges respectively,
slidable sealing joints with slidingly un-restrained center surfaces between adjacent ones of the segment leading and trailing edges,
a frame having first and second side rails supporting the first and second basesheet side edges respectively of the basesheet, and
the divergent seals in sealing engagement against the divergent flaps along the first and second side rails.

24. An aircraft gas turbine engine exhaust nozzle as claimed in claim 23 further comprising slidably sealingly engaged overlapping flanges at the adjacent ones of the segment leading and trailing edges and tacked together transversely spaced apart first and second distal ends of the overlapping flanges.

25. An aircraft gas turbine engine exhaust nozzle as claimed in claim 24 further comprising the overlapping flanges including inwardly and outwardly bent over flanges overlapping along a common interface.

26. An aircraft gas turbine engine exhaust nozzle as claimed in claim 25 further comprising inwardly bent ribs supporting the inwardly bent over flanges at the segment leading edges and outwardly bent ribs supporting the outwardly bent over flanges at the segment trailing edges.

27. An aircraft gas turbine engine exhaust nozzle as claimed in claim 26 further comprising the upper rail segments including longitudinally spaced apart and transversely extending slots receiving within and clipping together adjacent ones of the leading edge outwardly and inwardly bent ribs of the basesheet segments.

28. An aircraft gas turbine engine exhaust nozzle as claimed in claim 27 further comprising the panel body of each of the basesheet segments being sandwiched between the upper and lower rail segments and the panel body of each of the basesheet segments being bonded to the upper and lower rail segments of first and second side rails along the first and second segment side edges respectively.

29. An aircraft gas turbine engine exhaust nozzle assembly as claimed in claim 28 further comprising the panel body of each of the basesheet segments being bonded to the upper and lower rail segments by tack welds.

30. An aircraft gas turbine engine exhaust nozzle basesheet as claimed in claim 23 further comprising:
the basesheet and frame mounted to a longitudinally extending backbone by the forward, center, and aft hangers,
the lug portions of the forward and center hangers having forward and center retaining hooks respectively,
the forward and center retaining hooks engaging forward and center shelves at forward and center attachment locations of the backbone, and
the lug portion of the aft hanger connected to the backbone at the aft attachment location.

31. An aircraft gas turbine engine exhaust nozzle as claimed in claim 30 further comprising the forward, center, and aft hangers having lug portions extending substantially perpendicularly upwardly from substantially flat hanger heads and transversely spaced apart first and second tabs of the hanger heads disposed between forward, center, and aft raised flanges of the upper rail segment and the panel bodies of supporting ones of the basesheet segments.

32. An aircraft gas turbine engine exhaust nozzle as claimed in claim 31 further comprising longitudinally spaced apart sets of forward and aft vibration dampeners extending transversely away from and outboard with respect to the backbone and sprung to engage a back side of the basesheet assembly or the basesheet.

* * * * *